Aug. 2, 1949.  M. H. SWEET  2,478,163
LOGARITHMIC PHOTOMETER
Filed Dec. 30, 1944

INVENTOR.
MONROE H. SWEET
BY [signature]
ATTORNEY

Patented Aug. 2, 1949

2,478,163

UNITED STATES PATENT OFFICE 2,478,163

LOGARITHMIC PHOTOMETER

Monroe Hamilton Sweet, Binghamton, N. Y., assignor to General Aniline & Film Corporation, New York, N. Y., a corporation of Delaware Application December 30, 1944, Serial No. 570,627

8 Claims. (Cl. 250—27)

This invention relates to electron multiplier tube measuring circuits, and more particularly to novel circuits for providing a direct indication upon a uniformly graduated meter scale of electrical magnitudes which vary exponentially.

In numerous mensuration operations, a much desired object is to obtain a direct indication of electrical values which are inherently a logarithmic function of certain physical or electrical phenomena. A typical example is the measurement of the density of a photographic film. In the usual measuring instrument for determining the value of the film density, the light flux transmitted through the film is directed upon a suitable photo sensitive device, such as a photo-emissive vacuum tube. The output of the phototube is then amplified, and the relative current or voltage values thereof are indicated upon a suitable current or voltage indicating meter. The radiant flux incident upon the phototube is an inverse logarithmic function of the density of the film. Since the output of a phototube is generally linearly related to input excitation, the indicating meter must be provided with a scale graduated logarithmically, if it is desired to read density directly. As is known, a logarithmic scale is non-uniformly graduated, the indicia thereof being crowded near one end of the scale and being widely spaced near the opposite end thereof. The non-uniformity of the scale graduations adversely affects the accuracy and facility of the meter readings.

Various expedients have been proposed for obtaining direct indications of density on a meter having a substantially uniformly graduated density scale. Among such expedients, cut pole pieces for the magnet in the field of which the coil of the meter rotates have been used to vary the sensitivity of response thereof over different portions of the scale. The results obtainable by such expedients have been generally unsatisfactory. In my United States Patent 2,406,716, issued August 27, 1946, for "Direct reading densitometer," there is described and claimed a suitable electronic measuring circuit for obtaining direct readings upon a uniformly graduated meter scale of the density of a photographic film. In such circuit, a logarithmic amplifier is provided between the output of a phototube and the indicating meter. The parameters of the amplifier are so selected that the meter indicates directly the density of the sample upon a uniformly graduated scale. The light flux incident upon the phototube is an inverse logarithmic function of the density of the sample, and the output current of the phototube is a direct function of the light incident thereupon. By interposing a logarithmically responsive amplifier between the phototube and the meter, the relative current flowing through the meter is made a direct function of the density of the sample. The described circuit has been satisfactory in practice.

However, there have recently been made available electron multiplier tubes which have a sensitivity several thousandfold that of simple vacuum tubes used for amplification in conventional circuits. Typical of the electron multiplier tubes are the electrostatically focused photomultiplier types, in which the output per unit of incident radiant energy is several thousandfold greater than that of simple photoemissive type vacuum tubes. These multiplier tubes have opened a wide field for obtaining increased sensitivity of response in mensuration circuits.

The incorporation of such multiplier tubes in circuits having linear amplification presents no difficulty. However, when it is attempted to incorporate such tube into a logarithmically responsive circuit, considerable difficulties are presented. In my United States Patent 2,417,023, issued March 4, 1947, for "Photo-electric electron multiplier tube photometer circuits," are described circuits for successfully utilizing a photomultiplier tube in a circuit for directly indicating density values upon a uniformly graduated meter scale using a logarithmic amplifier between the multiplier tube and the meter. The present invention relates to another type of circuit, in which the photomultiplier tube is made to function as a non-linear e. g. logarithmic amplifier and may be followed by a linear amplifier stage which controls the meter movement.

It is among the objects of this invention to provide an electronic measuring circuit for indicating, upon a uniformly graduated meter scale, electrical quantities which vary in an exponential ratio such as a logarithmic ratio; to provide a measuring circuit employing an electronic multiplier tube and including means for varying the output of the tube in a manner to obtain direct indications upon a uniformly graduated meter scale of electrical quantities which vary logarithmically the rate of excitation of the multiplier tube; to provide a direct reading densitometer including a photomultiplier tube and a meter having a uniformly graduated linear scale for directly indicating density; and to provide novel circuit arrangements for obtaining direct indications upon a uniformly graduated meter scale of functions logarithmically related to the excitation of the measuring circuit.

These and other objects, advantages and novel features of the invention will be apparent from the following description and the accompanying drawing. In the drawing.

In accordance with the principles of the present invention, an electrostatically focused electron multiplier tube is arranged in responsive relation to a source of radiant energy. A sample, the density of which is to be indicated on a suitable meter having a uniformly graduated scale, is interposed between the tube and a light source. Means are provided for varying the potentials applied to the elements of the multiplier tube in such a manner that the meter readings are logarithmically related to the radiant energy incident upon the multiplier tube.

The means provided for controlling the amplification of the photomultiplier tube in such manner as to change it from a normally linear device to one which will have a non-linear response comprises an inverse feed-back circuit. This circuit is so arranged that in the feed-back path the output energy from the photomultiplier tube is applied to a control element which in turn modifies the effective operating potentials applied to dynode elements and thereby varies the effective amplification of the multiplier tube in an inverse ratio with the output thereof. The indicating meter may be connected either in the output circuit of a linear amplifier associated with the output circuit of the electron multiplier tube, or, alternatively, the meter may be connected directly in the anode circuit of the photomultiplier tube itself. Means are provided for introducing a bucking current into the meter circuit to establish a zero reference point for a current value denoting zero density.

While the invention will be particularly described as applied to photometer or densitometer circuits, it will be apparent to those skilled in the art that the invention is not limited thereto, and such description is exemplary only. The principles of the invention are applicable equally to electron multiplier devices which are either current or voltage excited to obtain direct readings of logarithmic functions, and to types of photometers other than densitometers.

Figure 1:
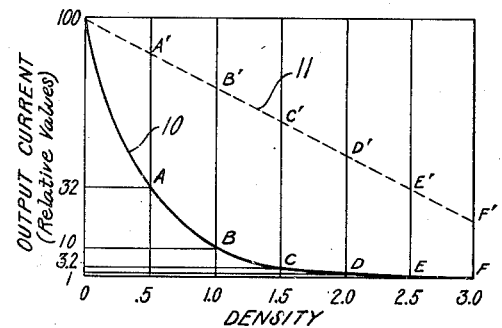
Fig. 1 is a graph illustrating the relation between density of a sample and output current in a conventional density measuring electronic circuit having linear amplification.

Referring to the drawing, Fig. 1 is a graph illustrating the relation between the density of a sample, such as a photographic film, and the relative values of the current through the indicating meter in a circuit employing a photo responsive device and a linear amplifier. The density is an inverse logarithmic function of the amount of light passing through the sample and incident upon the photo responsive device, and the output current of the linear amplifier is a direct function of such incident light. The meter indicates the relative values of the output current of the amplifier. If the meter is to indicate density directly, its scale must therefore be logarithmic, and thus non-uniformly graduated. For instance, referring to Fig. 1, at a density value of two, the relative current through the meter is represented by the factor one; at a density value of 1.0, the relative meter current is represented by the factor ten; and at a density value of zero, the relative current through the meter is one hundred times the current therethrough at a density value of two. In other words, the relative currents through the meter for any given density are logarithmically related to each other. This results in the solid line curve 10 shown in Fig. 1.

For purposes of increasing the accuracy and facility of reading the meter, it is highly desirable that the meter have a uniformly graduated scale. However, it is not possible to use such a uniformly graduated scale where the meter indicates density directly and a linear amplifier is used between the photo responsive device and the meter. The indications of a meter having a uniformly graduated scale indicating density directly are represented by the broken line 11 of Fig. 1. In other words, to obtain direct readings of the density on a meter having a uniformly graduated scale, the output current through the meter must be increased at corresponding points by the difference between the solid curved line 10 and the broken line 11, or at any other vertical line intersecting the curve in the graph.

The present invention provides an arrangement for automatically varying the sensitivity of a photomultiplier tube in such a manner that the desired increase in the output current through the indicating meter will be substantially obtained at any given reading. In other words, with the circuits shown in Figs. 2 and 3, the output current through the meter at the density values given in Fig. 1 is increased from the values A, B, C, D, E and F to substantially the values A', B', C', D', E' and F'. In the present invention, this is accomplished by controlling the potentials applied to the multiplier electrodes or "dynodes" of the electron multiplier tube in accordance with the output current of such tube.

An understanding of how this is accomplished may be had by reference to the following Table I illustrating the relation between sample density, flux incident upon the cathode of the multiplier tube, the desired meter reading, and the amplification of the tube.

*Table I*

| Density of Sample | Relative Incident Flux | Desired Meter Reading | Amplification Factor |
|---|---|---|---|
| 3.0 | 1 | 1 | 1.00 |
| 2.5 | 3.2 | 1.5 | .47 |
| 2.0 | 10 | 2 | .20 |
| 1.5 | 32 | 2.5 | .078 |
| 1.0 | 100 | 3 | .030 |
| 0.5 | 320 | 3.5 | .011 |
| 0.0 | 1,000 | 4 | .004 |

From published data on one type of photomultiplier tube relating the output sensitivity of the tube to the potential applied between the multiplier electrode or dynodes, a set of dynode potentials may be computed which will provide the proper amplification factors as listed in Table II. These values are as follows:

*Table II*

| Density of Sample | Amplification Factor | Dynode Voltage |
|---|---|---|
|  |  | Volts per stage |
| 3.0 | 1.00 | 57.5 |
| 2.5 | .47 | 52 |
| 2.0 | .20 | 46 |
| 1.5 | .078 | 40 |
| 1.0 | .030 | 35 |
| 0.5 | .011 | 30 |
| 0.0 | .004 | 25 |

Figure 2:
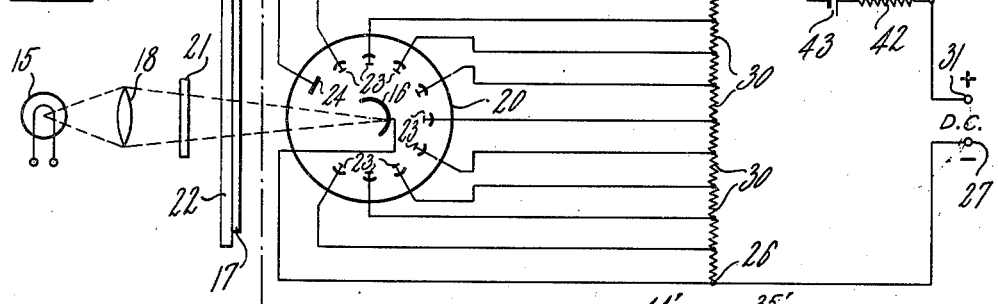
Fig. 2 is a schematic circuit diagram illustrating one embodiment of my invention.
Figure 3:
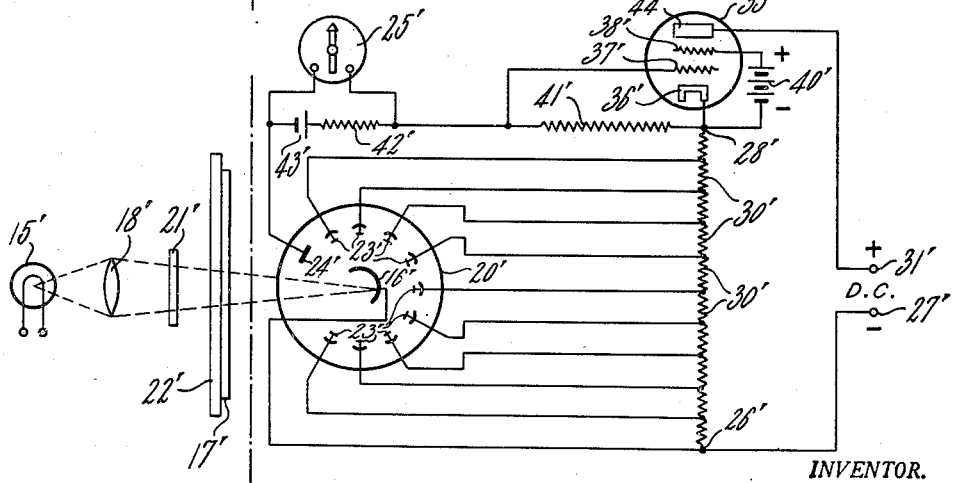
Fig. 3 is a schematic circuit diagram illustrating another embodiment of the invention.

It will be noted from Table II that the relation between the sample density and the dynode potentials is linear within close limits. Accordingly, if the dynode voltages are linearly controlled as a function of the sample density, the amplification factor for providing the desired uniform meter reading may be simply obtained. Figs. 2 and 3 illustrate circuits which operate in the manner to obtain the above results.

Referring to Fig. 2, a light source such as an incandescent lamp 15 is arranged in operative relation to a photomultiplier tube 20, which may, for example, be of the RCA-931 type. Cathode 16 of tube 20 is arranged to receive light from lamp 15 directed thereon through a sample 17, the density of which is to be measured and indicated by a meter 25 operatively associated with the output circuit of tube 35. Light from lamp 15 may, if desired, be directed through a lens 18, a filter 21 and a transparent support 22 onto cathode 16 of tube 20.

The operating potentials applied to cathode 16, multiplier elements or dynodes 23 and anode 24 of tube 20 are obtained from a suitable power supply having terminals 27 and 31 with the polarity indicated.

The voltage from the power supply is applied to the elements of the photomultiplier tube 20 in such manner that there is a control tube in the supply current path as well as a current indicating instrument. For this reason the positive terminal of the supply connects to the anode 44 of the control tube 35 and the cathode 36 thereof connects to a voltage divider consisting of a plurality of resistors 30 in series, the last one of which terminates at the negative terminal of the supply. The junction points of resistors 30 connect to respective dynode elements 23 and the anode 24 of phototube 20 connects through a load resistance 41 to the junction point indicated with reference character 28, of the voltage divider and the cathode 36 of tube 35.

From this it is seen that the current in the voltage divider elements 30 is controlled by the control tube 35 inasmuch as the divider is in effect the cathode resistor of this tube. In the circuit shown the control tube 35 is illustrated as a tetrode for the sake of simplicity. A pentode may also be used or a triode provided it has the required transfer characteristics. As will be seen the control tube may have a dual function in that aside from controlling the effective dynode voltage it may also amplify current variations of the amplifier output circuit and apply them to the indicating instrument.

The control grid 37 of tube 35 is connected to anode 24 of tube 20 and the screen grid 38 connects to the positive terminal of a power supply shown here by a battery 40. The negative terminal of the battery returns to cathode 36. The resistor 42 and suitable source of potential such as a battery 43 in series therewith are connected in parallel with meter 25. The purpose of this arrangement will be described hereinafter in considering the operation of the circuit. In a practical example, resistor 41 may have a value of 50,000 ohms. The ten series connected resistors 30 forming the voltage divider may each have a value of 13,000 ohms, where the potential of the supply is 1000 volts.

The circuit shown in Fig. 2 operates in the following manner. Control tube 35 controls the current flowing through resistors 30 and thus the effective operating potential applied between cathode 16, dynodes 23 and anode 24 of tube 20. The potential of control grid 37 of tube 35 with respect to cathode 36 is governed by the voltage drop across the anode load resistor 41 of the phototube 20. When the output current in the anode load resistor 41 of phototube 20 is high, corresponding to low densities of sample 17, the voltage drop across resistor 41 will also be high. This creates a relatively large negative bias on control grid 37 of tube 35. The relatively large negative bias decreases the amplification of tube 35 and thereby reduces the current flow through voltage divider 30. The decreased current flow through voltage divider 30 results in a corresponding reduction in the potentials applied between the elements of photomultiplier tube 20.

It will be noted that the effective operating potentials applied to the elements of phototube 20 are reduced as a linear function of the output current of the device. Thus, the linear relations between the density of sample 17 and the potential applied to the elements of tube 20, indicated as desirable in Table II supra, are obtained.

The output current from plate 44 of tube 35 is approximately a linear function of the potential variations of control grid 37 of the tube over a considerable portion of the grid potential-anode current characteristic curve. The anode circuit of tube 35 includes the meter 25. Accordingly, the latter indicates the output current of tube 35. The output current of tube 35 varies linearly with variations in the output current of device 20. At controlled dynode voltages the output current of device 20 is substantially a logarithmic function of the light flux incident upon its cathode 16 through sample 17. The incident light flux is an inverse logarithmic function of the density of the sample. Consequently, the indications of meter 25 are a direct function of the density of sample 17 and a uniformly graduated scale may be used for the meter.

On any uniform scale densitometer, infinite density would theoretically yield an infinite positive or negative response. For obvious reasons, only a finite range of densities can be measured by the meter. Accordingly, a bucking current is introduced into the meter circuit so that the meter will read the maximum measurable density at one extreme of its scale. This bucking current is introduced by the battery 43, through the series resistor 42 and opposes the anode current of the tube 35 at the particular density value chosen to be represented by zero meter indication.

Since the tube 35 is not only a control tube but functions also as substantially a linear amplifier of the output voltage of phototube 20, it will be evident that the indicating meter may likewise be placed in the output circuit of phototube 20 instead of being placed in the output circuit of tube 35 if the additional gain is not required. Such an arrangement is illustrated in Fig. 3 wherein elements corresponding to those in Fig. 2 have been given the same reference characters primed. In the circuit of Fig. 3, one meter terminal is connected to anode 24' of device 20', and the other terminal is connected to the anode load resistor 41'. Anode 44' of tube 35' is connected to terminal 31' of the current source. Terminal 27' of the current source is connected to terminal 26' of voltage divider 30'. Terminal 28' of voltage divider 30' is connected to cathode 36' of tube 35' and resistor 41' is connected between grid 37' and cathode 36'. Similarly, a battery 40' is used to supply screen grid potential for tube 35'. The aforementioned bucking current is introduced into meter 25' by resistor 42' connected in series with battery 43' across the terminals of the meter. The potentials applied to dynodes 23' and cathode 16' of device 20' are obtained, as before, from voltage divider 30'.

In the circuit of Fig. 3, a meter 25' of greater sensitivity than meter 25 of the circuit of Fig. 2 is required as the current through the meter is only the output current of device 20', whereas, in Fig. 2, the meter current is the output current of phototube 20 amplified by control tube 35. Thereby, in the arrangement shown in Fig. 3 a less sensitive meter may be used than the meter 25' in Fig. 3. Otherwise, both circuits operate in the same manner.

A typical set of values obtained by using the circuit of Fig. 2 with ten 13,000 ohms individual series connected resistors 30 comprising the voltage divider, and 41 a 50,000 ohm resistor is indicated in the following Table III:

*Table III*

| Sample Density | Meter Output Current (Relative Values) |
|---|---|
| .00 | 100 |
| .13 | 96.8 |
| .38 | 89.5 |
| .60 | 85 |
| .88 | 77 |
| 1.21 | 67 |
| 1.56 | 54 |
| 1.90 | 42 |
| 2.21 | 31 |
| 2.54 | 17 |
| 2.83 | 6 |
| 3.05 | 2 |

Figure 4:
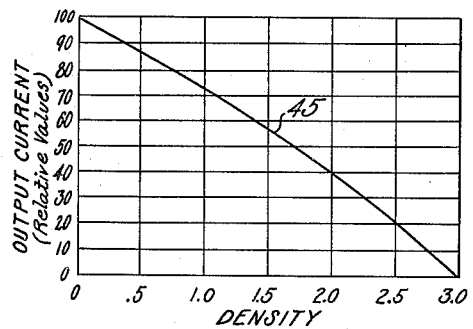
Fig. 4 is a graph illustrating the relation between sample density and output current with the circuits shown in Figs. 2 and 3.

A voltage stabilized 15 C. P. incandescent lamp at a distance of four inches from cathode 16 of phototube 20 was used as the light source, and condenser lens 18 was omitted. On the particular meter used, 100 divisions on the uniformly graduated scale thereof corresponded to an output current of five milliamperes and the zero mark on the scale corresponded to an output current of three milliamperes. These values are indicated by the curve 45 in the graph shown in Fig. 4. The foregoing figures are representative only and are given merely to illustrate a practical application of the principles of the invention.

It will be noted that the invention provides a simple, effective and stable circuit for obtaining direct readings of density on a meter having a uniformly graduated scale, through the medium of a photomultiplier tube. The source of current need not necessarily be direct current, but may be alternating current. As previously stated, the principles of the invention are applicable not only to radiant energy excited multiplier tubes, but also to other types of electron multiplier tubes. Thus, grid controlled voltage excited electron multiplier tubes can be incorporated in circuits designed in accordance with the principles of the present invention to obtain direct readings, on a uniformly graduated meter scale, of electrical values which are longarithmically related.

While specific embodiments of the invention have been described in detail to illustrate the application of the principles thereof, it will be apparent to those skilled in the art that the invention may be otherwise embodied without departing from such principles.

What is claimed is:

1. A logarithmically responsive electronic circuit, comprising in combination, an electron multiplier tube including a plurality of dynode stages; a source of pontential; means for supplying graduated potentials to successive dynode stages; and means for controlling the effective potentials between successive dynode stages in inverse relationship to the anode current of said multiplier tube, said means comprising variable impedance means in series between said source of potential and said means for supplying graduated potentials, and a circuit responsive to said anode current connected to said impedance means.

2. A logarithmically responsive electronic circuit, comprising in combination, an electrostatically focused electron multiplier tube including a plurality of dynode stages; a source of potential; means for supplying graduated potentials to successive dynode stages; and means for controlling the effective potentials between successive dynode stages in inverse relationship to the anode current of said multiplier tube, said means comprising variable impedance means in between said source of potential and said means for supplying graduated potentials, and a circuit responsive to said anode current connected with said impedance means for varying the effective impedance thereof.

3. A logarithmically responsive electronic circuit, comprising in combination, a photo responsive electron multiplier tube including a plurality of dynode stages; a source of potential; means for supplying graduated potentials to successive dynode stages; and means for controlling the effective potentials between successive dynode stages in inverse relationship to the anode current of said multiplier tube, said means comprising variable impedance means connected in series between said source of potential and said means for supplying graduated potentials, and means responsive to said anode current connected to the output of said multiplier tube and with said variable impedance means whereby the effective impedance of said last-mentioned means is varied in accordance with the current in said anode current responsive means.

4. A logarithmically responsive electronic circuit, comprising in combination, a photo responsive electrostatically focused electron multiplier tube including a plurality of dynode stages; a source of potential; means for supplying graduated potentials to successive dynode stages; and means for controlling the effective potentials between successive dynode stages in inverse relationship to the anode current of said multiplier tube, said means comprising variable impedance element connected in series between said source of potential and said means for supplying graduated potentials, an output circuit for said multiplier tube including output current responsive means and said variable impedance means.

5. A logarithmically responsive electronic circuit, comprising in combination, an electrostatically focused electron multiplier tube including a plurality of dynode stages; a source of potential; means for supplying graduated potentials to successive dynode stages; and means for controlling the effective potentials between successive dynode stages in inverse relationship to the anode current of said multiplier tube, said means comprising a vacuum tube having anode, cathode and control electrodes, an input circuit between said control electrode and said cathode including an impedance element responsive to the anode current of said multiplier tube, an output circuit between anode and cathode of said vacuum tube including said source of potential and said means for supplying graduated potentials substantially in series.

6. A logarithmically responsive electronic circuit, comprising in combination, an electron multiplier tube including a plurality of dynode stages; a source of potential; means for supplying graduated potentials to successive dynode stages; and means for controlling the effective potentials between successive dynode stages in inverse relationship to the anode current of said multiplier tube, said means comprising a control vacuum tube having anode, cathode and control electrodes, a circuit between said anode and said cathode including said means for supplying graduated potentials in the form of a resistance element having a plurality of portions connected to respective dynode stages, and said source of potentials substantially in series; a circuit between said control electrode and said cathode including a grid resistance common to the output circuit of said multiplier tube whereby the grid voltage of said control tube is determined by the anode current in said grid resistance and the conductivity of said tube controlled by said grid voltage determines the effective dynode voltages developed across portions of said resistance element.

7. A logarithmically responsive electronic circuit comprising in combination, an electrostatically focused electron multiplier tube including anode and intermediate multiplier electrodes; a source of potential; a voltage divider including a plurality of series resistors connected to said intermediate multiplier electrodes, and means for modulating the potentials between successive multiplier electrodes in inverse relationship to the anode current of said mutiplier tube, said means comprising a control tube having anode, cathode and control electrodes, a circuit between said anode and said cathode including said voltage divider and said source of potential substantially in series; a circuit between said control electrode and said cathode including a grid resistance common to the output circuit of said multiplier tube whereby the grid voltage of said control tube is determined by the anode current in said grid resistance and the conductivity of said tube controlled by said grid voltage determines the effective dynode voltages developed across said series resistors and a current indicating meter in the output circuit of said control tube the indication of which is directly proportional to the current in said voltage divider.

8. A logarithmically responsive electronic circuit comprising in combination, an electrostatically focused electron multiplier tube including anode and intermediate multiplier electrodes; a source of unidirectional potential; a voltage divider including a plurality of series resistors each connected to one of said intermediate multiplier electrodes, and means for controlling the effective potentials between successive multiplier electrodes in inverse relationship to the anode current of said multiplier tube, said means comprising a control having anode, cathode and control electrodes, a circuit between said anode and said cathode including said voltage divider and said source of potential substantially in series; a circuit between said control electrode and said cathode including a grid resistance common to the output circuit of said mutiplier tube whereby the grid voltage of said control tube is determined by the anode current in said grid resistance and the conductivity of said tube, controlled by said grid voltage, determines the effective dynode voltages developed across said series resistors and a current indicating meter in the output circuit of said multiplier tube the indication of which is directly proportional to the current in said grid resistance.

MONROE HAMILTON SWEET.

REFERENCES CITED

The following references are of record in the file of this patent:

UNITED STATES PATENTS

| Number | Name | Date |
|---|---|---|
| 2,093,166 | Flory et al. | Sept. 14, 1937 |
| 2,227,031 | Schlesinger | Dec. 31, 1940 |
| 2,227,095 | Liebmann | Dec. 31, 1940 |
| 2,231,697 | Zworykin et al. | Feb. 11, 1941 |
| 2,290,775 | Snyder, Jr. | July 21, 1942 |
| 2,361,549 | Kott | Oct. 31, 1944 |
| 2,407,564 | Martin et al. | Sept. 10, 1946 |
| 2,417,023 | Sweet | Mar. 4, 1947 |

OTHER REFERENCES

Larson et al., pages 226, 229, July 1940, RSI.

Article by John Russel, R. S. I., December 1937, pages 495–6, vol. 8.

"A Precision Direct-Reading Densitometer," an article by M. H. Sweet in Journal of the Society of Motion Picture Engineers for Feb. 1942, pages 148–172 cited; pages 153–160 especially relied upon.